United States Patent [19]

Cockerham

[11] Patent Number: 4,881,401

[45] Date of Patent: Nov. 21, 1989

[54] KNOCK DETECTION SYSTEM

[75] Inventor: Kevin Cockerham, Sutton Coldfield, England

[73] Assignee: Lucas Industries public limited company, Birmingham, United Kingdom

[21] Appl. No.: 162,972

[22] Filed: Mar. 2, 1988

[30] Foreign Application Priority Data

Mar. 4, 1987 [GB] United Kingdom ............... 8705023

[51] Int. Cl.$^4$ .......................................... G01L 23/22
[52] U.S. Cl. ...................................................... 73/35
[58] Field of Search ........................................... 73/35

[56] References Cited

U.S. PATENT DOCUMENTS

| 3,393,557 | 7/1968 | Brown et al. | 73/35 |
| 4,329,871 | 5/1982 | Grossner et al. | 73/35 |
| 4,343,278 | 8/1982 | Asano | 73/35 |
| 4,467,634 | 8/1984 | Rohde et al. | 73/35 |
| 4,523,567 | 6/1985 | Iwata | 73/35 |

FOREIGN PATENT DOCUMENTS 57-146121  9/1982  Japan ..................... 73/35

OTHER PUBLICATIONS

L. J. Weber et al., *Electrical Measurement Systems for Biological and Physical Scientists* (Addison-Wesley, Reading, Mass.), 1975, pp. 328–330.

Primary Examiner—John Chapman
Attorney, Agent, or Firm—Nixon & Vanderhye

[57] ABSTRACT

A knock detection system for an internal combustion engine comprises an input for receiving a signal from a vibration sensing transducer and two bandpass filters and connected to the input. A first bandpass filter passes a band of frequencies containing the characteristic knock frequency, so that it passes the knock-representing component together with noise. The second bandpass filter passes an adjacent band of frequencies having substantially no knock component content but a noise component corresponding to that passed by the first filter. The outputs of the two bandpass filters are referenced to each other (e.g. by rectifying their outputs on opposite polarities and summing) to cancel out the noise and provide a signal which represents the knock component included in the output from the vibration-sensing transducer.

4 Claims, 1 Drawing Sheet

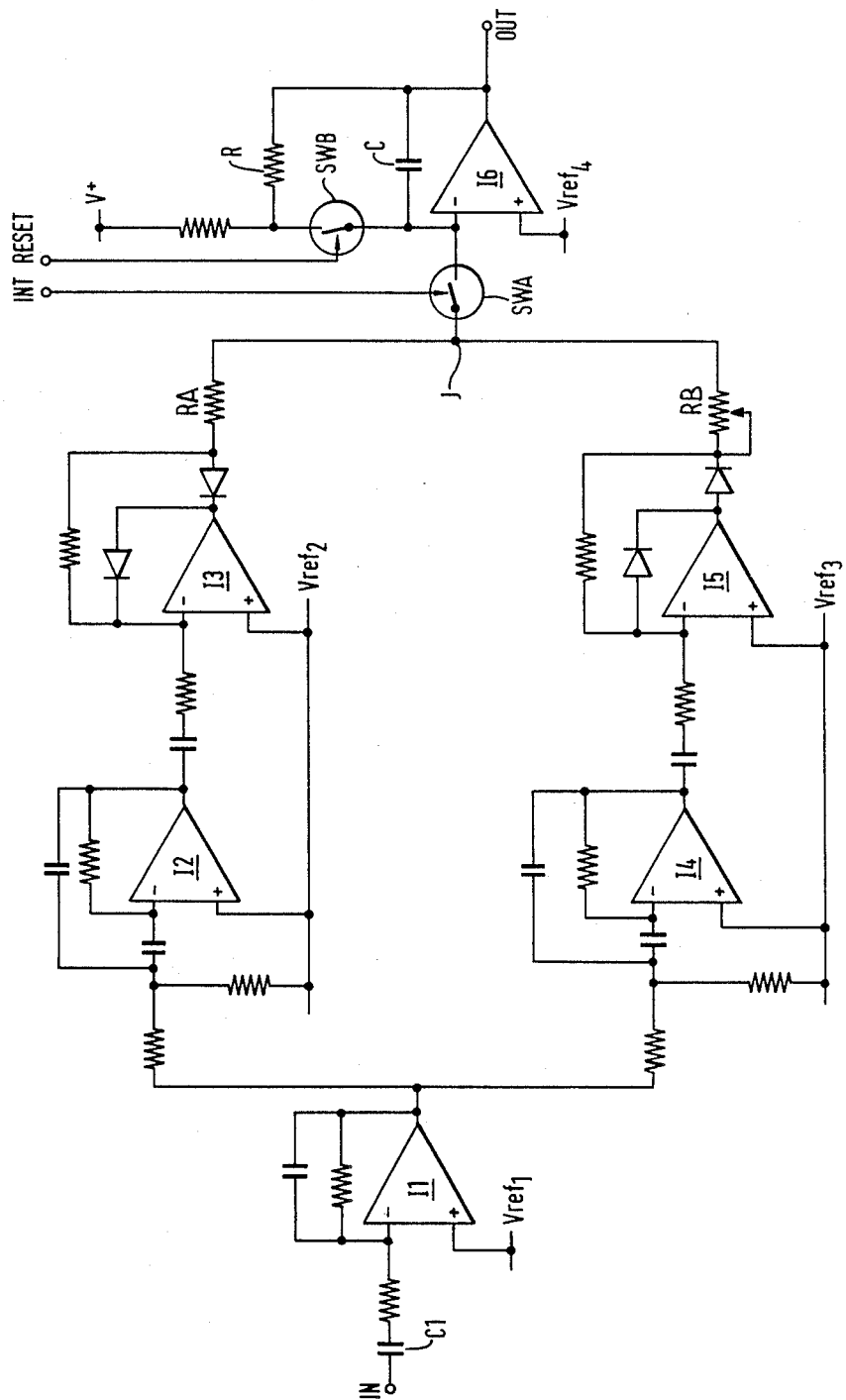

KNOCK DETECTION SYSTEM

This invention relates to a knock detection system for an internal combustion engine.

It is known to provide an internal combustionengine with a system for detecting the effect known as knock and for adjusting the ignition timing accordingly so as to terminate the knock condition. Known knock detection systems comprise a piezoelectric or other vibration-sensng transducer mounted to the engine and serving to convert engine vibrations into an electric signal. This electric signal however includes not only the required knock component, but also components which are due to other vibrations and to noise. Various approaches have been made to separate the required knock component from the other or noise components of the transducer output signal, but these approaches have been limited in effect or reliability at least over the full speed range of the engine. Particular problems are that the signal from the knock-sensing transducer vary considerably over the operating range of an engine and moreover there are variations from engine-to-engine and even from cylinder-to-cylinder within the same engine.

We have now devised a knock detection system which successfully separates the required knocking component from the noise components of the transducer output signal.

In accordance with this invention, there is provided a knock detection system for an internal combustion engine, comprising an input for receiving a signal from a vibration-sensing transducer, two bandpass filters to which said input is connected, a first said filter being arranged to pass the knock component of the received signal and the second said filter having a pass band adjacent that of the first bandpass filter but so as to substantially block said knock component, and means for referring the output of said first bandpass filter to the output of said second bandpass filter so as to provide a knock-representing signal.

Thus, the first bandpass filter passes a band of frequencies containing the characteristic knock frequency, and typically the band 6 kHz to 7 kHz. The adjacent frequency band (e.g.1.5 kHz to 3 kHz) which is passed by the second bandpass filter will have no or substantially no knock component content. But both frequency bands will contain the noise components and these noise components will vary in similar manners in the outputs of the two filters. By referring the output of the first filter to that of the second filter, a signal is provided which is relatively free of the noise components and reliably represents the knock component over a wide range of conditions.

The means for referring the output of the first filter to the output of the second filter may comprise rectifiers of opposite polarity connected to the outputs of the respective filters, and a signal summing means connected to the outputs of the two rectifiers. In this arrangement, the summing means receives two signals each containing corresponding but opposite-polarity noise components, one of these signals containing the required knock component. The noise components of these two signals cancel each other and the knock component is accordingly separated out. Preferably the signal provided by the summing means is integrated to provide an output signal which is proportional to the knock signal level over a predetermined angular period (for each cylinder of the engine) during which knock would be expected to occur.

An embodiment of this invention will now be described by way of example only and with reference to the accompanying drawing, the single figure of which is a circuit diagram of a knock detection system in accordance with the invention.

Referring to the drawing, there is shown a knock detection system for an internal combustion engine of a vehicle. The system comprises a signal input IN which is connected to a piezoelectric or other vibration-sensing transducer mounted to the engine. This input IN is connected via a coupling capacitor C1 to the inverting input of an operational amplifier I1 configured as a signal amplifier stage. The output of amplifier stage I1 is connected to the inputs of two parallel signal channels I2,I3 and I4,I5. The first of these signal channels comprises operational amplifiers I2 and I3 configured respectively as a bandpass filter and a rectifier, and the second signal channel comprises operational amplifiers I4 and I5 also configured respectively as a bandpass filter and a rectifier. The non-inverting input of stage I1 is connected to a reference source Vref1, the non-inverting inputs of stages I2 and I3 are connected to a reference source Vref2 and the non-inverting inputs of stages I4 and I5 are connected to a reference source Vref3. It will be noted particularly that the rectifier stage I3 is configured to rectify in the opposite polarity to rectifier stage I5.

The outputs of the two rectifier stages I3 and I5 are connected to a summing junction J and this is connected via an electronic switch SWA to the inverting input of an operational amplifier I6 configured as an integrator stage. A second electronic switch SWB is connected in series with a resistor R across the integrating capacitor C. The switches SWA and SWB are controlled from external circuitry (optionally a microprocessor) over lines INT and RESET, closing switch SWA for each integration process and closing switch SWB afterwards to reset the capacitor. The non-inverting input of integrator stage I6 is connected to a reference source Vref4.

In use of the knock detection system shown in the drawing, the input IN receives a signal from the vibrationsensing transducer and this signal is amplified by stage I1 and then applied to the two signal channels I2,I3 and I4,I5. The bandpass filter I2 passes a band of frequencies containing the characteristic knock frequency, and typically has a pass-band of 6 kHz to 7 kHz. The output from the rectifier I3 thus includes a knock-representing component together with noise. The bandpass filter I4 passes an adjacent band of frequencies (e.g. 1.5 kHz to 3 kHz) which will have no or substantially no knock component content. The output from the rectifier I5 thus comprises noise corresponding to the noise component of the signal provided from rectifier I3, but of opposite polarity. These noise signals thus vary in corresponding manners but in opposite polarities.

The signals from the two channels (i.e. from the two rectifiers I3,I5) are summed at junction J for application to the integrator stage I6. In this summing process, the noise components of the two signals substantially cancel each other, leaving a signal which represents the knock component of the vibration-sensing transducer output.

The integrator stage I6 integrates the knock-representing signal, which emerges from junction J, over a predetermined angular window for each cylinder, to provide a signal at its output OUT which is proportional to the knock component level over that period.

The output OUT may be connected to an analogue-to-digital converter for processing by a microprocessor, or can be connected to a comparator for a simple non-microprocessor system, and thereby used for controlling the ignition timing so as to terminate any knock condition which is sensed. As mentioned previously, switch SWA is closed for the duration of each integrating period, and then switch SWB is closed to reset the integrating capacitor C.

It will be appreciated that the first signal channel I2,I3 passes a band containing knock frequencies and its output is then referenced to the output of the second signal channel I4,I5, which blocks all or substantially all of the knock component but which will otherwise track the output of the first signal channel. Thus the signal fed into the integrator is relatively unaffected by variations in the signal provided by the vibration-sensing transducer. The integrator will inherently compensate for any difference in time of travel in the two channels wherein a transient spike entering one channel arrives at the integrator before a corresponding spike in the other channel.

In the example shown in the drawing, the reference sources Vref2 and Vref3 for the filter and rectifier stages I2,I3 and I4,I5 may be varied in accordance with engine operating parameters determined by an engine management system for the engine. The reference source Vref4 for the integrator stage may be varied with the sources Vref2 and Vref3, or it may simply be varied according to engine speed. However, it is also envisaged that separate and independent reference sources may be provided for each of the operational amplifiers I1 and I6.

It will be noted that series resistors $R_A$ and $R_B$ connect the outputs of the respective rectifier stages I3, I5 to the summing junction J. Preferably at least one of these resistors $R_A$, $R_B$ is adjustable, so that compensation can be made for differences between the energy levels of the outputs delivered by the two rectifier stages I3,I5.

What is claimed is:

1. A knock detection system for an internal combustion engine having a vibration sensing transducer, said knock detection system comprising:
    an input for receiving a signal from said vibration sensing transducer, which signal includes a knock component;
    first and second bandpass filter means connected to said input, each bandpass filter means having an output, said first bandpass filter means being arranged to pass said knock component of the received signal and said second bandpass filter means having a pass band adjacent that of said first bandpass filter means for substantially blocking said knock component;
    means for comparing the output of said first bandpass filter means with the output of said second bandpass filter means so as to provide a knock-representing signal, said comparing means comprises rectifying means connected to the outputs of said bandpass filter means; and means for forming said knock-representing signal as the difference between said rectified outputs of said first and second bandpass filter means, said rectifying means including means for rectifying opposite polarities of outputs from said first and second bandpass filter means and said means for forming said knock-representing signal comprises a summing means; and
    integrating means for integrating said knock-representing signal for a predetermined period.

2. A knock protection system as claimed in claim 1 wherein said integrating means comprises:
    an integrating capacitor, connected to said knock-representing signal; and
    control means for resetting said integrating capacitor after said predetermined period of time.

3. A knock detection system as claimed in claim 2, in which the second bandpass filter means passes a frequency band which is lower than the frequency band passed by the first bandpass filter means.

4. A knock detection system as claimed in claim 2, further comprising adjustment means for compensating for differences in energy level between the rectified outputs of the two bandpass filter means.

* * * * *